(12) United States Patent
Campbell

(10) Patent No.: US 8,376,098 B2
(45) Date of Patent: Feb. 19, 2013

(54) RESISTANCE MECHANISM FOR A PEDAL ASSEMBLY

(75) Inventor: Andrew Campbell, East Kilbride (GB)

(73) Assignee: CTS Corporation, Elkhart, IN (US)

( * ) Notice: Subject to any disclaimer, the term of this patent is extended or adjusted under 35 U.S.C. 154(b) by 853 days.

(21) Appl. No.: 12/319,430

(22) Filed: Jan. 6, 2009

(65) Prior Publication Data

US 2009/0173587 A1    Jul. 9, 2009

Related U.S. Application Data

(60) Provisional application No. 61/010,217, filed on Jan. 7, 2008.

(51) Int. Cl.
*F16D 69/00* (2006.01)
*B65H 59/10* (2006.01)

(52) U.S. Cl. .......................... 188/265; 74/560

(58) Field of Classification Search .............. 188/67, 188/82.7, 206 R, 265, 266; 74/162, 531, 74/512–513, 560
See application file for complete search history.

(56) References Cited

U.S. PATENT DOCUMENTS

| | | | | |
|---|---|---|---|---|
| 3,392,987 A * | 7/1968 | Muller et al. | ............... | 180/409 |
| 3,885,449 A | 5/1975 | Green | | |
| 4,309,022 A * | 1/1982 | Reinicke et al. | ............ | 251/61.4 |
| 4,467,663 A * | 8/1984 | van der Lely | ................. | 74/15.4 |
| 4,519,267 A * | 5/1985 | Takahashi | ................. | 74/473.27 |
| 5,416,295 A | 5/1995 | White et al. | | |
| 5,634,379 A | 6/1997 | Barnard | | |
| 5,768,946 A | 6/1998 | Fromer et al. | | |
| 5,934,152 A | 8/1999 | Aschoff et al. | | |
| 6,134,987 A | 10/2000 | Kalsi | | |
| 6,167,778 B1 | 1/2001 | Kohlen | | |
| 6,179,081 B1 | 1/2001 | Engelgau | | |
| 6,220,114 B1 | 4/2001 | Ray | | |
| 6,418,813 B1 | 7/2002 | Lewis | | |
| 2002/0152831 A1 | 10/2002 | Sakamoto et al. | | |
| 2004/0200309 A1 | 10/2004 | Hasegawa et al. | | |
| 2005/0097980 A1 | 5/2005 | Menzies | | |

FOREIGN PATENT DOCUMENTS

| | | |
|---|---|---|
| EP | 0 748 713 A2 | 6/1995 |
| EP | 0 670 235 A1 | 2/1996 |
| EP | 0 748 713 A3 | 6/1996 |
| EP | 0 926 581 A2 | 12/1997 |
| EP | 0 926 581 A3 | 12/1998 |
| EP | 1 033 275 A2 | 2/2000 |
| EP | 1 129 884 B1 | 3/2001 |
| WO | WO 02/39202 | 5/2002 |

OTHER PUBLICATIONS

Popescu, Alexandru, PCT International Search Report mailed Apr. 2, 2009 re: International Application No. PCT/US2009/000067 filed Jan. 6, 2009. Popescu, Alexandru, PCT Written Opinion of the International Searching Authority mailed Apr. 2, 2009 re: International Application No. PCT/US2009/000067 filed Jan. 6, 2009.

* cited by examiner

*Primary Examiner* — Melody Burch
(74) *Attorney, Agent, or Firm* — Daniel J. Deneufbourg

(57) ABSTRACT

A resistance mechanism used in motor vehicle accelerator pedals for generating an opposing mechanical force. The resistance mechanism includes a piston adapted for movement in a housing between a first detent or stop position and a second compressed position. The piston includes an exterior surface defining at least one recess. A spring, located in the housing, biases the piston in the first position. A pin in the housing is seated in the recess of the piston in the first position of the piston. A retainer is adapted to retain the pin in the piston recess in the first position of the piston. The piston is adapted for movement between the first position and a second compressed position in which the pin is forced out of the recess and into the housing.

6 Claims, 6 Drawing Sheets

RESISTANCE MECHANISM FOR A PEDAL ASSEMBLY

CROSS-REFERENCE TO RELATED APPLICATION

This application claims the benefit of the filing date and disclosure of U.S. Provisional Patent Application Ser. No. 61/010,217 filed on Jan. 7, 2008, the contents of which are entirely incorporated herein by reference as are all references cited therein.

FIELD OF THE INVENTION

This invention pertains generally to vehicle pedals and, more specifically, to accelerator pedals that use electrical position sensors.

DESCRIPTION OF THE RELATED ART

Typical vehicle pedal cases are mechanical, typically incorporating a cable or various gears and other transmission devices to convert the limited rotary motion available from the pedal into useful mechanical motion. Other pedals incorporate some type of position sensor that converts the mechanical position into an electrical signal. In the field of automobiles and trucks, a mechanical bracket using a cable, often referred to as a Bowden cable, is the standard method for controlling the throttle of internal combustion engines. These pedal assemblies have a desirable feel and functionality and, with a few refinements, are extremely reliable. This type of pedal assembly defines the mechanical standard today.

As noted, through time, there have been a number of attempts at different types of pedal devices to control machines. One major attempt has been to introduce an electrical linkage between the pedal and the device to be controlled. An electrical linkage is desirable since gear assemblies are bulky, expensive and limited due to their inherent size to those applications where the pedal is very close to the controlled device. Gear and other mechanical linkages are also prone to sticking or binding. While the Bowden cable has proved generally reliable, the penetration of moisture and other contaminants may still cause the cable to bind or freeze up during inclement weather.

A potentiometer is often used to sense the position of the accelerator pedal. This potentiometer is in some ways similar to the volume controls used in radio and television receivers. A voltage is applied across two extreme ends of a resistor. An intermediate tap is provided between the two extremes of the resistor. The tap is mechanically linked to the device which is to be sensed, and the position of the device is determined by the voltage at the intermediate tap.

There are several stringent requirements placed upon a pedal position sensor that make it different from a volume control. Since the pedal is used to measure a demand for power, binding of the pedal shaft in a position demanding power could result in life-threatening situations. Safety and reliability are essential in automotive pedal applications.

The automotive environmental requirements are also different from a radio or television receiver. The pedal position sensor must reside in a dirty environment with widely varying temperatures. An operator may often bring large amounts of dirt or mud into the pedal region. Temperatures might, for example, range from −55 to +150 degrees Celsius. Further, the device may be exposed to a number of solvents and other adverse conditions associated with automotive environments. These requirements diverge greatly from the typical volume control.

In the prior art, levers or special mechanical drives were used to interface the electrical position sensor to the pedal. These drives ensured that, even in the event of some sensor malfunction, the pedal sensor would not retain the pedal in an acceleration position, but instead would allow the pedal to return to an idle stop. Engagement between the sensor and the pedal shaft then necessitated the use of a return spring so that, as the pedal shaft returned to idle position, the pedal position sensor would also follow and track the position of the pedal.

The pedal position sensor in the prior art typically has been a freestanding, self-contained device. In addition to the return spring, a well-sealed package including the associated bearings is typically provided. Significant effort was directed at designing a package that was sealed against the adverse chemicals, dirt and moisture that might otherwise damage the sensor.

Variations in contact pressure, contact orientation, lube and other similar factors all impact the performance of the sensor. Further, field replacement is important for service repair, and the service replacement should be of the same quality as the original device. Failure to fully and completely package the sensor results in loss of precise control over lube thickness and composition; lost protection of vital components while shelved awaiting installation and during installation; and lost control over contactor and element relationships that are all desirable features.

Attempts at incorporating electrical sensors into pedals have had poor tactile feel for the operator. The pedal is no longer attached to any mechanical assembly like a cable that provides friction and resistance to overcome during operation. Since operators have become accustomed to the feel of a mechanical pedal, it is desirable to continue this feeling with electronic pedals.

One difficulty encountered with providing the feel of a mechanical pedal is that the mechanism to accomplish the feedback must be contained within a small area inside the pedal. This leads to problems with packaging, abrasion and strength of material issues with the resistance or kickdown mechanism that provides a tactile feedback to the user. The present invention offers a pedal resistance mechanism that delivers superior ergonomics for the pedal operator in a small package.

SUMMARY OF THE INVENTION

It is a feature of the invention to provide a device for generating an opposing mechanical force for use in motor vehicle accelerator pedals.

An additional feature of the invention is to provide a resistance mechanism or module that includes a case or housing for a piston that defines at least one exterior recess or groove adapted to receive a pin. A spring in the housing biases the piston in a first detent or stop position. In the detent position, a retainer associated with the housing biases the pin inwardly in the piston recess. The piston is movable in the housing between the first detent or stop position where the pin is seated in the recess of the piston and the spring is extended; and a second depressed or extended position within the interior of the housing in which the force of the piston moves the pin out of the recess and compresses the spring.

In one embodiment, the resistance module is adapted to be press-fitted into a cavity defined in the underside of the arm of a pedal and the piston is depressed when the arm is rotated and brought into contact with a protuberance or the like formed on a pedal assembly base.

There are other advantages and features of this invention which will be more readily apparent from the following detailed description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

It is noted that the drawings of the invention are not to scale.

DETAILED DESCRIPTION OF THE EMBODIMENT

Figure 1:
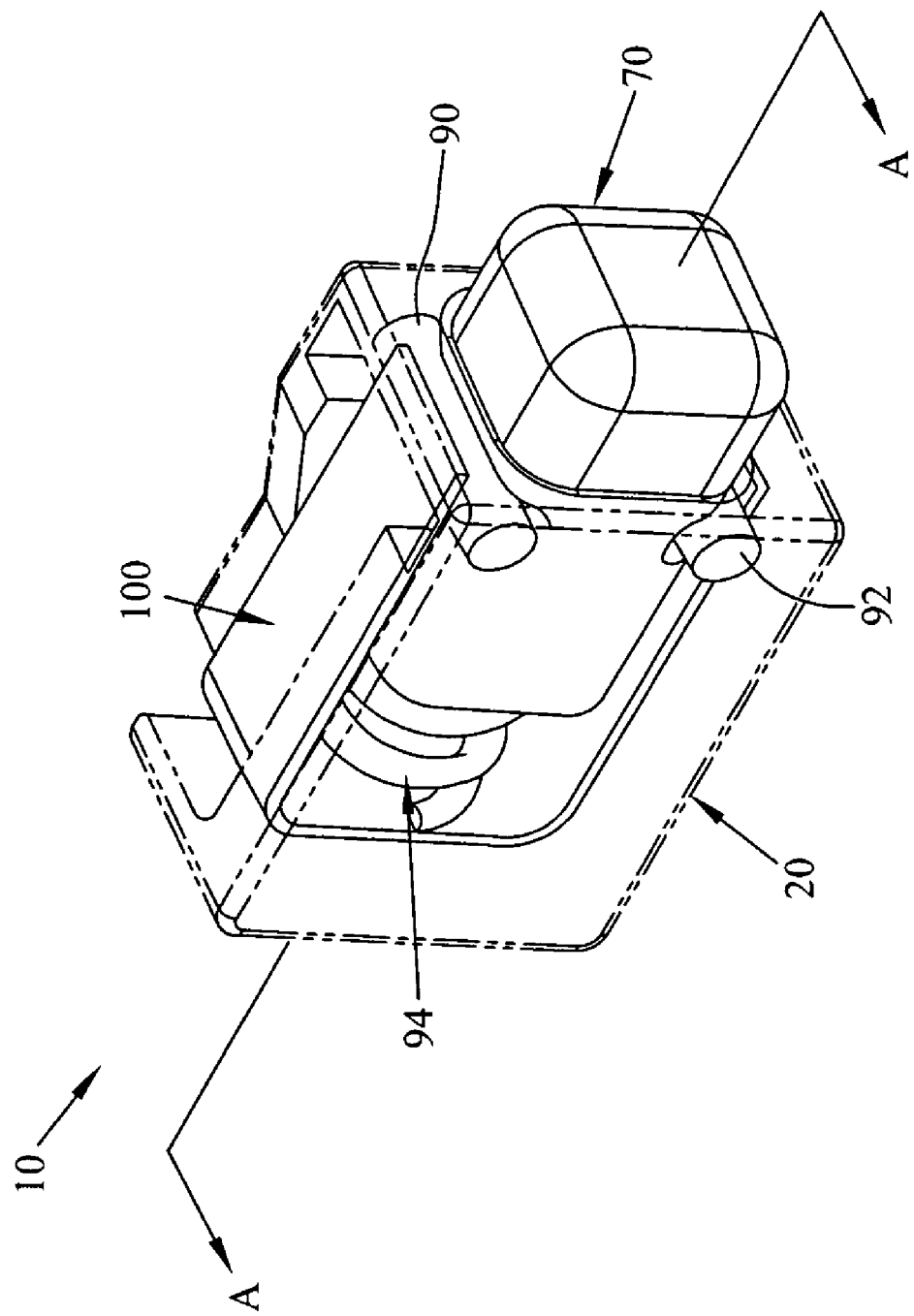
FIG. 1 is an overall perspective view of an assembled pedal resistance mechanism or module in accordance with the present invention with the housing shown in phantom.
Figure 2:
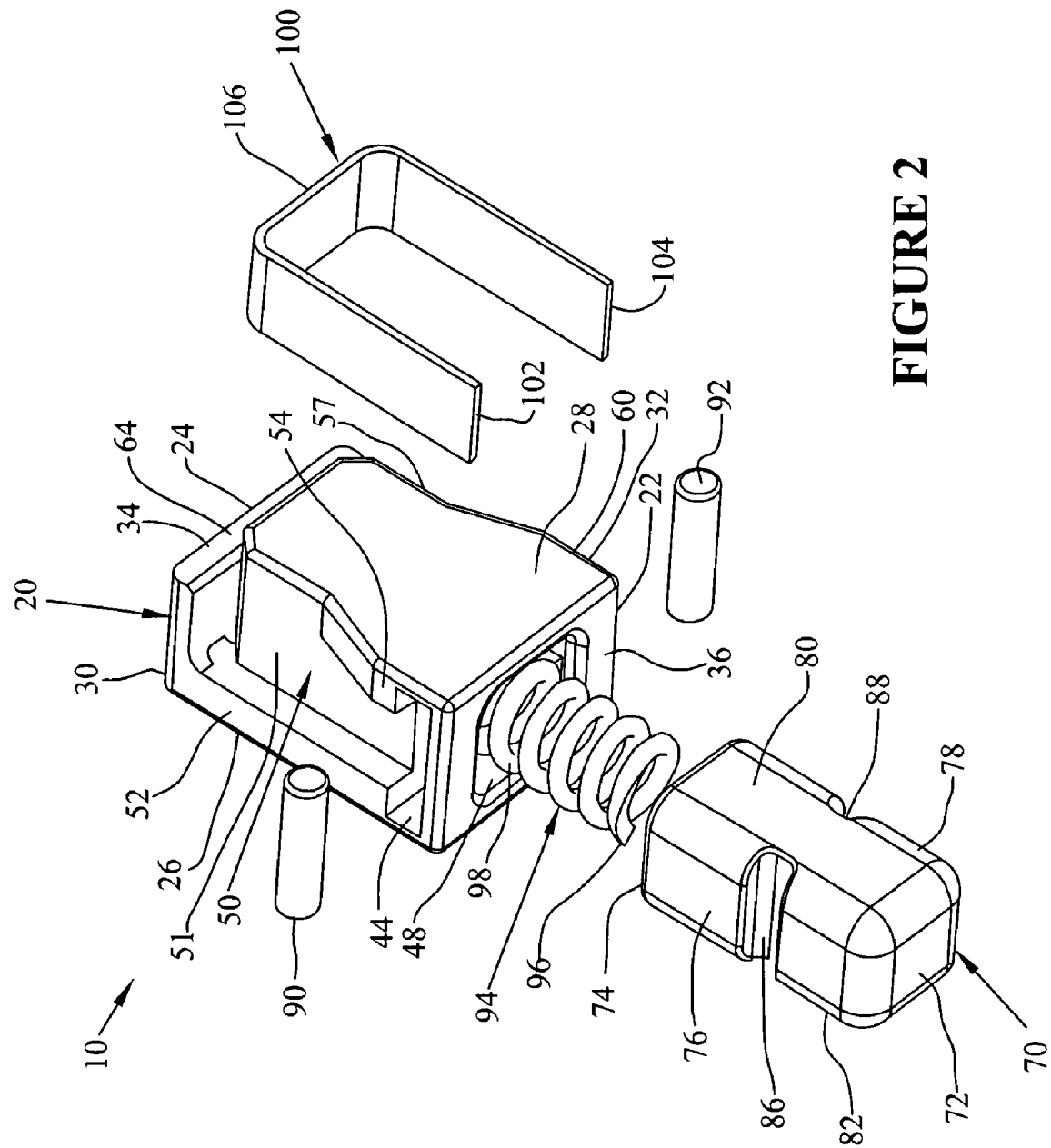
FIG. 2 is an exploded perspective view of the module shown in FIG. 1.

FIGS. 1 and 2 show a pedal resistance mechanism or kickdown mechanism or module 10 in accordance with the present invention. Pedal resistance mechanism or module 10 provides an opposing force to the foot of a driver. The pedal can be an accelerator pedal used in a motor vehicle.

Mechanism or module 10 has a generally rectangularly-shaped housing or case 20. In one embodiment, case 20 is formed from machined steel. In another embodiment, case 20 is formed from molded plastic. Case 20 has opposed ends 22 and 24. Case 20 further defines six sides including opposed, sides 26 and 28; opposed sides 30 and 32; and opposed sides 34 and 36 (FIG. 2).

Figures 3, 4:
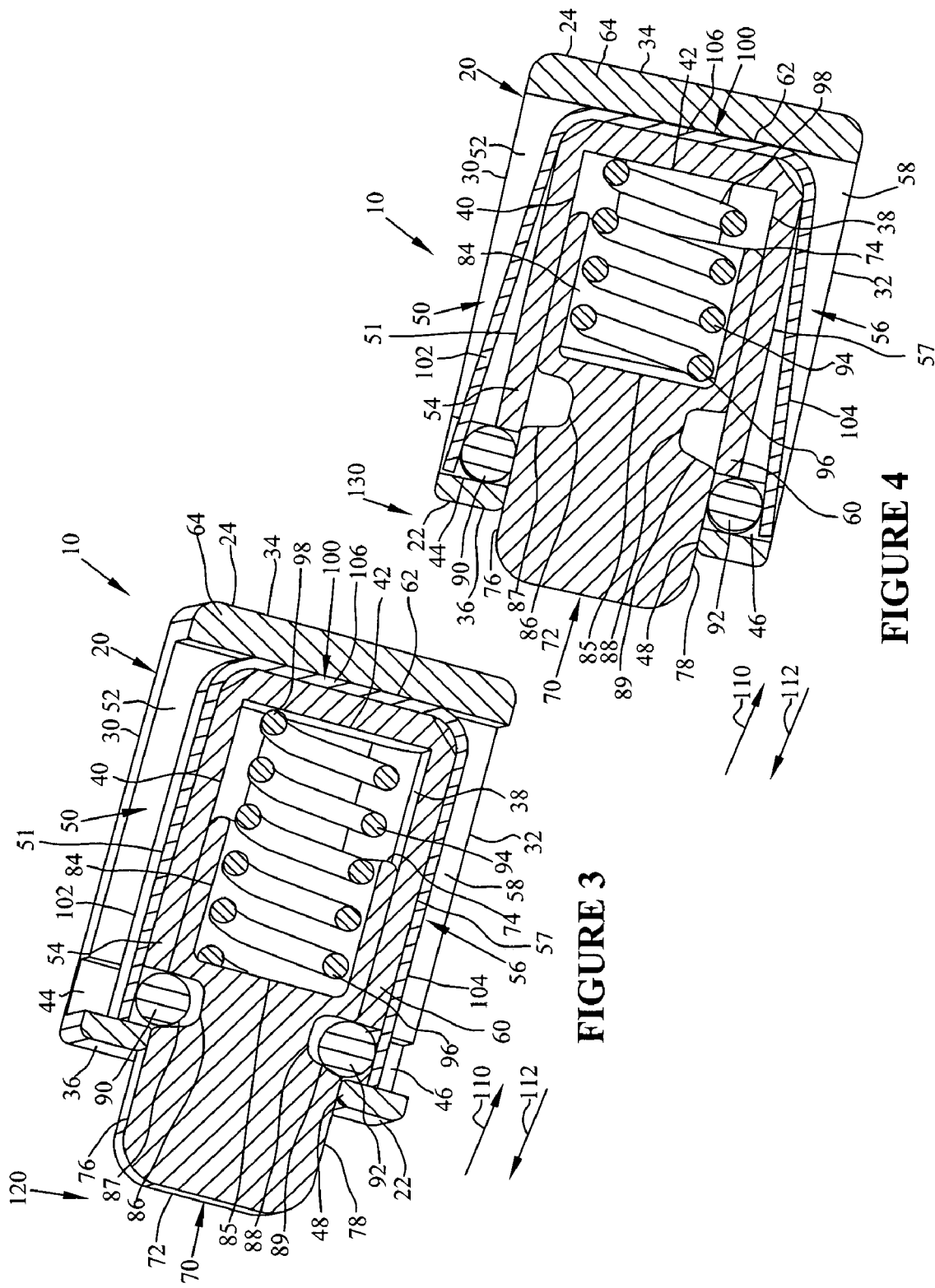
FIG. 3 is a side elevational cross-sectional view of the module shown in FIG. 1 taken along section line A-A in FIG. 1 with the piston in its detent or stop position.
FIG. 4 is a side elevational cross-sectional view of the module shown in FIG. 1 taken along section line A-A in FIG. 1 with the piston in its depressed extended position.

Case 20 further defines a cylindrically-shaped interior bore or cavity 38 (FIGS. 3 and 4) that extends through case 20 in a relationship general co-linear with the longitudinal axis of case 20. Bore 38 is defined by interior side wall 40 and interior end wall 42 (FIGS. 3 and 4). End wall 42 extends in an orientation generally normal to the longitudinal axis (generally designated by the line A-A in FIG. 1) of case 20. Side wall 40 extends generally parallel to the longitudinal axis (generally designated by the line A-A in FIG. 1) of case 20.

An aperture 48 (FIGS. 3 and 4) is defined in the side 36 of case 20 and extends coaxially with bore 38. A rectangularly-shaped elongate slot 44 extends between side 30 and wall 40 and defines a passage into bore 38. A diametrically opposed rectangularly-shaped slot 46 extends between side 32 and wall 40 and also defines a passage into bore 38. Slots 44 and 46 are thus located on opposite sides of the housing 20 adjacent and parallel to housing wall or side 36 and extend in a relationship and direction generally normal to the direction of the longitudinal axis of housing 20.

Side 30 of case 20 further defines an elongated cavity 50 (FIGS. 2-4). A pair of elongated shoulders 52 and 54 (FIG. 2) are defined in side 30. Cavity 50 is located between shoulders 52 and 54 and extends in a relationship spaced from and parallel to housing longitudinal axis A-A. Side wall 51 is defined between shoulders 52 and 54.

Case 20 also defines a cavity 56 (FIGS. 3 and 4) that is located and defined in side 32 of housing 20 and also extends in a relationship spaced from and parallel to both housing longitudinal axis A-A and cavity 50. A pair of elongated shoulders 58 and 60 (FIGS. 2-4) are defined in side 32. Cavity 56 is located between shoulders 58 and 60. Side wall 57 is defined between shoulders 52 and 54.

An elongated groove or slot 62 (FIGS. 3 and 4) is defined in side 28 and defines a wall 64. Groove 62 is located between bottom wall 42 and wall 64 and extends in a relationship generally normal to housing longitudinal axis A-A and cavities 50 and 56. The cavities 50 and 56 and shoulder groove 62 in combination define a generally U-shaped peripheral recess defined in housing 20.

Figure 5:
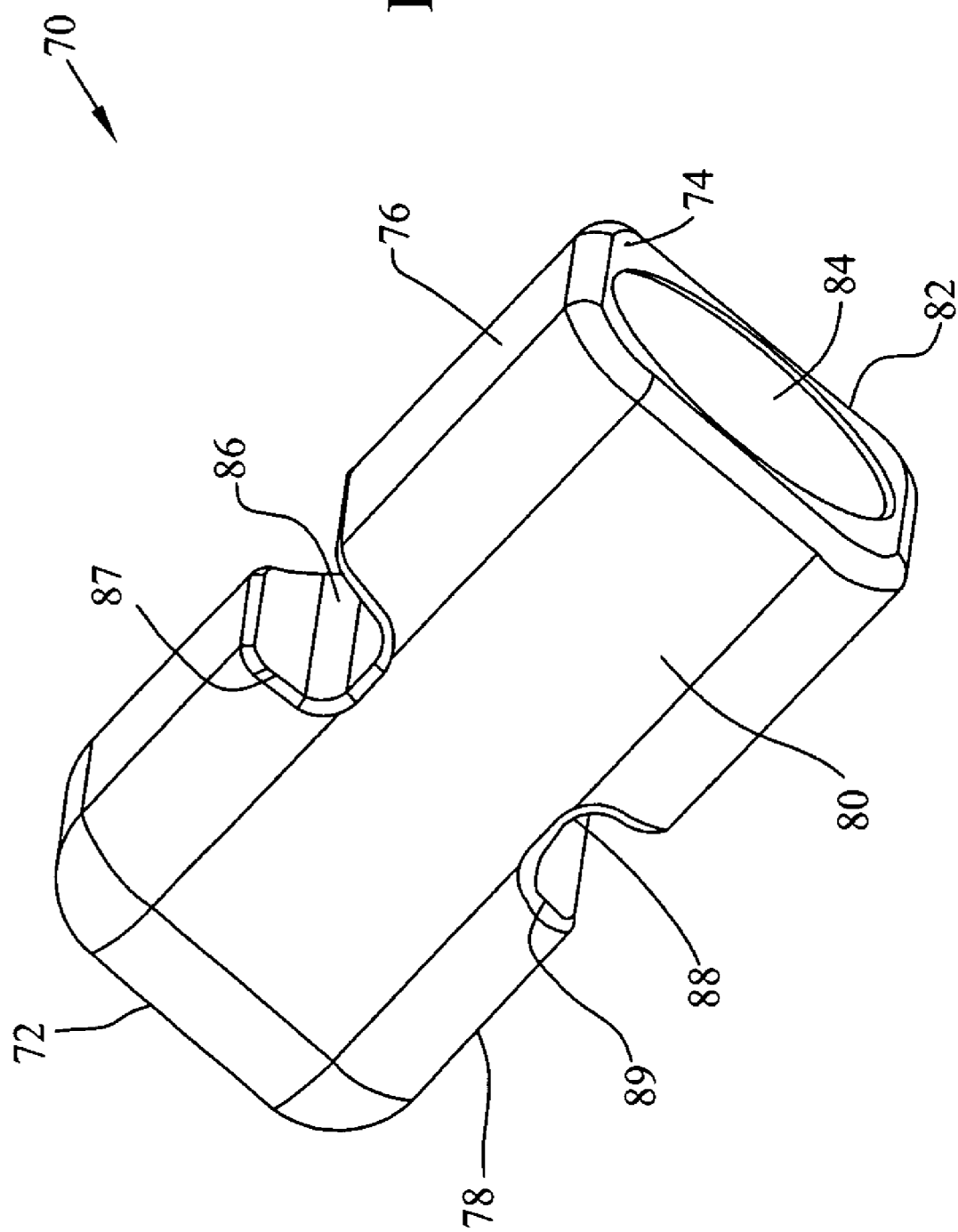
FIG. 5 is an enlarged perspective view of the piston of the module of the present invention.

FIG. 5 depicts the plunger or piston 70 of resistance mechanism 10. Piston 70 is adapted to be moveably mounted for reciprocating motion in bore 38 (FIGS. 3 and 4). In one embodiment, piston 70 is formed from molded plastic or machined steel. Piston 70 is substantially rectangular in shape with a generally square cross-sectional profile with rounded corners. Piston 70 includes opposed ends 72 and 74, opposed sides 76 and 78 and opposed sides 80 and 82. Bore 84 is defined by an aperture defined in end 74, extends through the interior of piston 70, and terminates in an interior piston wall 85 (FIGS. 3 and 4).

A substantially U-shaped elongate exterior recess 86 extends into the exterior surface of side 76. Recess 86 is defined by an interior angled surface 87 that extends between sides 80 and 82. Interior angled surface 87 further slopes toward end 72. Another diametrically opposed substantially U-shaped exterior elongate recess 88 extends into the exterior surface of opposed side 78. Recess 88 is defined by an interior angled surface 89 that extends between sides 80 and 82. Interior angled surface 89 further slopes toward end 72. Recesses 86 and 88 are diametrically opposed to each other and extend in an orientation and direction generally normal to the longitudinal axis (also generally designated by line A-A in FIG. 1) of the piston 70. In the embodiment shown, recesses 86 and 88 in piston and slots 44 and 46 in housing 20 are adapted to be the same length and width as rods 90 and 92 described below in more detail.

Piston 70 is adapted to be retained in bore 38. As shown in FIG. 3, distal end 74 is adapted to be inserted into the interior of bore 38 while proximal end 72 extends outwardly from the end 22 of case 20.

With continued reference to FIG. 3, a coil spring 94 is located in bore 38 and biases piston 70 outwardly from case 20. Spring 94 has opposed ends. 96 and 98. Distal end 98 rests against interior end housing wall 42 while proximal end 96 extends through the bore 84 of piston 70 and into contact with the piston interior wall 85.

A generally unitary U-shaped retainer 100 (FIGS. 1-4) has diametrically opposed arms 102 and 104 that extend normally outwardly from the opposed ends of a central base portion 106. Retainer 100 can be formed from metal or plastic. Retainer 100 is formed such that arms 102 and 104 are adapted to exert an inwardly directed spring force. Retainer 100 is mounted in the recess in housing 20 defined by cavities 50, 56 and groove 62 of case 20 in a relationship wherein arm 102 is located in cavity 50 between shoulders 52 and 54; arm 104 is located in cavity 56 between shoulders 58 and 60; and central base portion 106 is located in groove 62.

Thereby, retainer 100 is mounted in, and extends around the periphery of, housing 20 in a relationship wherein arms 102 and 104 extend generally between the opposed sides of housing 20 in a relationship generally spaced from and parallel to, and on opposite sides of, the central longitudinal axis of housing 20, while the base 106 extends in a relationship generally adjacent and parallel to housing end wall 24 and between housing sides 30 and 32 in a relationship generally normal to the longitudinal axis A-A of the housing 20.

An elongated cylindrical shaped rod or pin 90 (FIGS. 1-4) is mounted in, and extends the length of, slot 44 between arm 102 and piston 70. Similarly, an elongated cylindrical-shaped rod or pin 92 (FIGS. 1-4) is mounted in, and extends the length of, slot 46 between arm 104 and piston 70. Rods 90 and 92 are diametrically opposed to each other. The distal interior/inner end face of arm 102 contacts rod 90 and biases rod 90 towards side 76 of piston 70. In a like manner, the distal interior/inner end face of arm 104 contacts rod 92 and biases rod 92 towards side 78 of piston 70.

Piston 70 is mounted in bore 38 of case 20. Piston 70 can slide or be moved into case 20 in direction 110 (FIGS. 3 and 4) by applying an external compressive force to end 72 of piston 70 in direction 110. Spring 94 is naturally biased and compressed to urge or move piston 70 outwardly out of the case 20 in the direction 112 (FIGS. 3 and 4) when no external compressive force is being applied to end 72 of piston 70.

In an extended or rest position 120, when no external forces are being applied to end 72, spring 94 moves piston 70 in direction 112. When piston 70 moves rearwardly out of the housing 20 to a position where recesses 86 and 88 in piston 70 are aligned opposite rods 90 and 92 seated in housing slots 44 and 46 respectively, the distal interior end surfaces of the arms 102 and 104 of retainer 100 exert a force on and urge and bias rods 90 and 92 to move out of the housing slots 44 and 46 inwardly in the direction of and into the piston recesses 86 and 88 as shown in FIG. 3. The compressive force exerted by the respective retainer arms 102 and 104 holds respective rods 90 and 92 in the piston recesses 86 and 88. This provides and defines a detent or stop position for piston 70 and spring 94. In this position, rods 90 and 92 are oriented and extend in a relationship generally normal to the longitudinal axis A-A of housing 20 and piston 70.

When a large enough magnitude external compressive force is applied to the end 72 of piston 70 in direction 110 into case 20, piston 70 is depressed (i.e., moved inwardly into the casing 20) and causes rods 90 and 92 to overcome the spring force of arms 102 and 104 and move or force or bias the rods 90 and 92 outwardly out of the piston recesses 86 and 88 (FIG. 4) and into the housing slots 44 and 46 and allow piston 70 to move further inwardly in direction 110 into case 20 which, in turn, increases the spring force in retainer arms 102 and 104 and the compressive force of spring 94.

It is noted that piston recesses 86 and 88 have outer surfaces 87 and 89 that are slightly angled toward end 72 of piston 70 in order to facilitate rods 90 and 92 sliding out, or being forced out, of piston recesses 86 and 88.

A compressive force greater in magnitude than the combination of: the pre-set compressive force exerted by retainer arms 102 and 104 against rods 90 and 92 sliding out of piston recesses 86 and 88; the friction between sides 76, 78, 80, 82 of piston 20 and walls 40 of housing 20; and the spring force of spring 94 must be applied to the end 72 of piston 70 in order to force the pins or rods 90 and 92 out of the piston recesses 86 and 88. This was referred to above as the initial detent force or resistance that must be applied in order to start movement of piston 70 inwardly into case 20. This is a depressed or compressed position 130 of piston 70.

As force is further applied to end 72 following the movement of rods 90 and 92 out of the piston recesses 86 and 88, spring 94 continues to be compressed until end 74 of piston 70 contacts the interior distal end wall 42 of case 20 and stops any further motion of piston 70. Less force is required to move piston 70 into case 20 after the initial detent force or resistance has been overcome (i.e., following the movement of rods 90 and 92 out of the piston recesses 86 and 88).

The release of the compressive force applied to piston 70 causes spring 94 to decompress and move piston 70 back to its detent stop position and cause rods 90 and 92, with the assistance of the force applied to the respective rods 90 and 92 by the respective arms 102 and 104 of retainer 100, to slip back from inside respective housing slots 44 and 46 into respective piston recesses 86 and 88.

Figure 6:
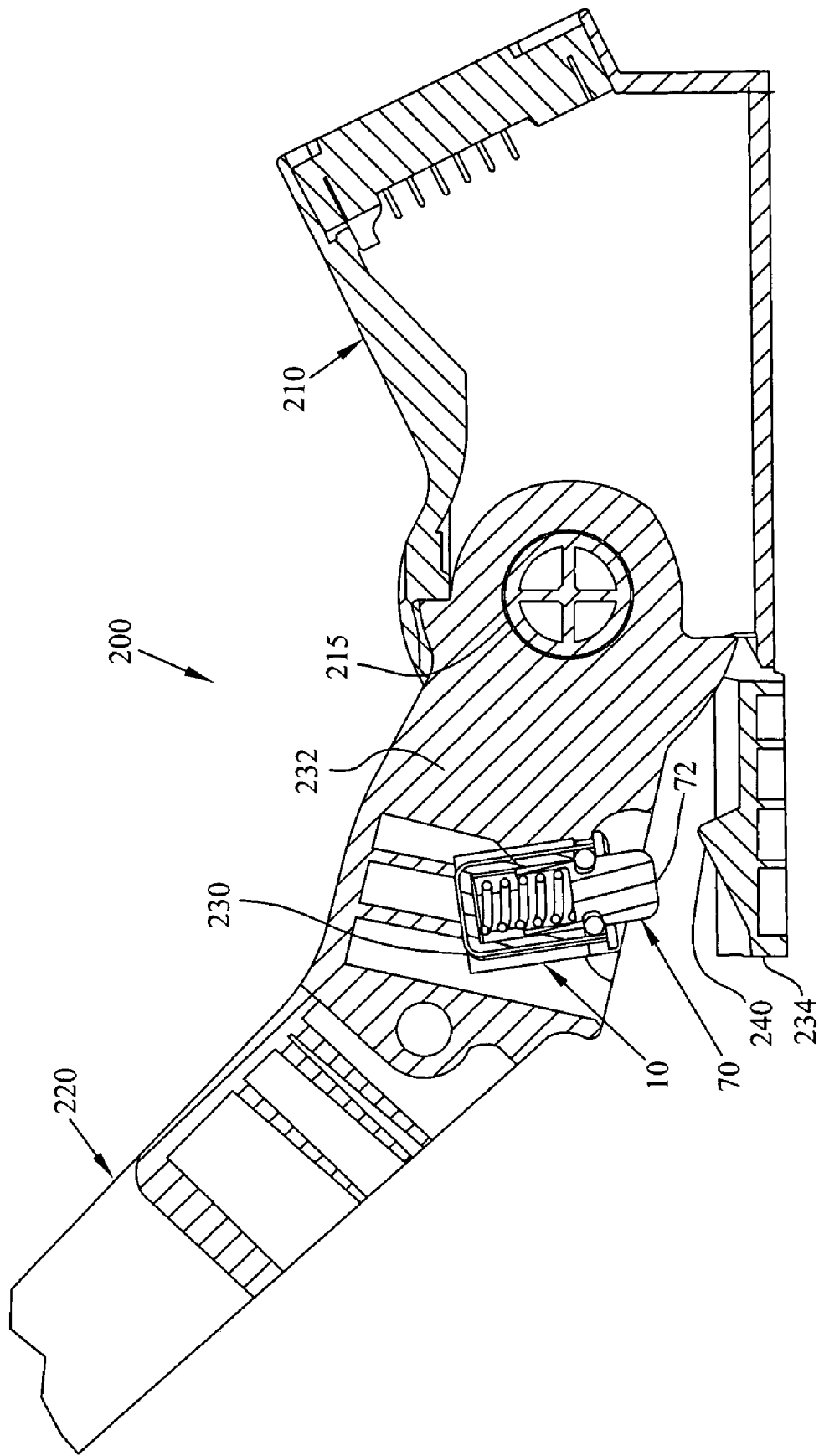
FIG. 6 is a broken-away side elevational cross-sectional view of the module of FIG. 1 mounted in a pedal assembly.

FIG. 6 depicts one embodiment of a pedal assembly 200 adapted to use pedal resistance mechanism 10. Pedal assembly 200 can be an accelerator pedal assembly that is mounted in a vehicle for controlling the operation of an engine. A pedal arm 220 is rotatably attached to pedal housing 210 by a bushing or shaft 215 such that pedal arm 220 rotates relative to pedal housing 210. Pedal arm 220 is adapted to be depressed by the foot of a vehicle operator or driver. Pedal housing 210 has a boss 240 that extends from pedal housing 210 in the direction of the lower face of the proximal end 232 of pedal arm 220.

Pedal arm 220 has a cavity 230 defined in an underside portion of a proximal, pivoting end 232 thereof. Pedal resistance mechanism or module 10 is mounted and retained in cavity 230. Pedal resistance mechanism 10 can be press-fit into cavity 230 such that end 72 of piston 70 protrudes outwardly from the outer surface thereof. A sensor (not shown) can be coupled to pedal arm 220 to sense the position of pedal arm 220.

In a vehicle, pedal arm 220 can be depressed by an operator causing pedal arm 220 and proximal end thereof to rotate generally counterclockwise relative to pedal housing 210. Continued depression of pedal arm 220 generally causes the end 72 of piston 70 to contact the exterior angled face of a boss, finger, protuberance, or ledge 240 defined in and protruding outwardly from the outer surface of a pedal base 234. Further depression of pedal arm 220 causes boss 240 to force piston 70 to move from the detent or stop position 120 (FIG. 3) of piston 70 to the depressed or compressed position 130 (FIG. 4) inside case 20. When piston 70 contacts boss 240, pedal resistance mechanism 10 generates an opposing force that is transmitted through the pedal arm 220 to the foot of the user. The opposing force is sensed by the user as an increased resistance to depression of the pedal. This increased resistance can indicate to the vehicle operator that the vehicle transmission is near a downshift point where the transmission shifts into a lower gear.

Figure 7:
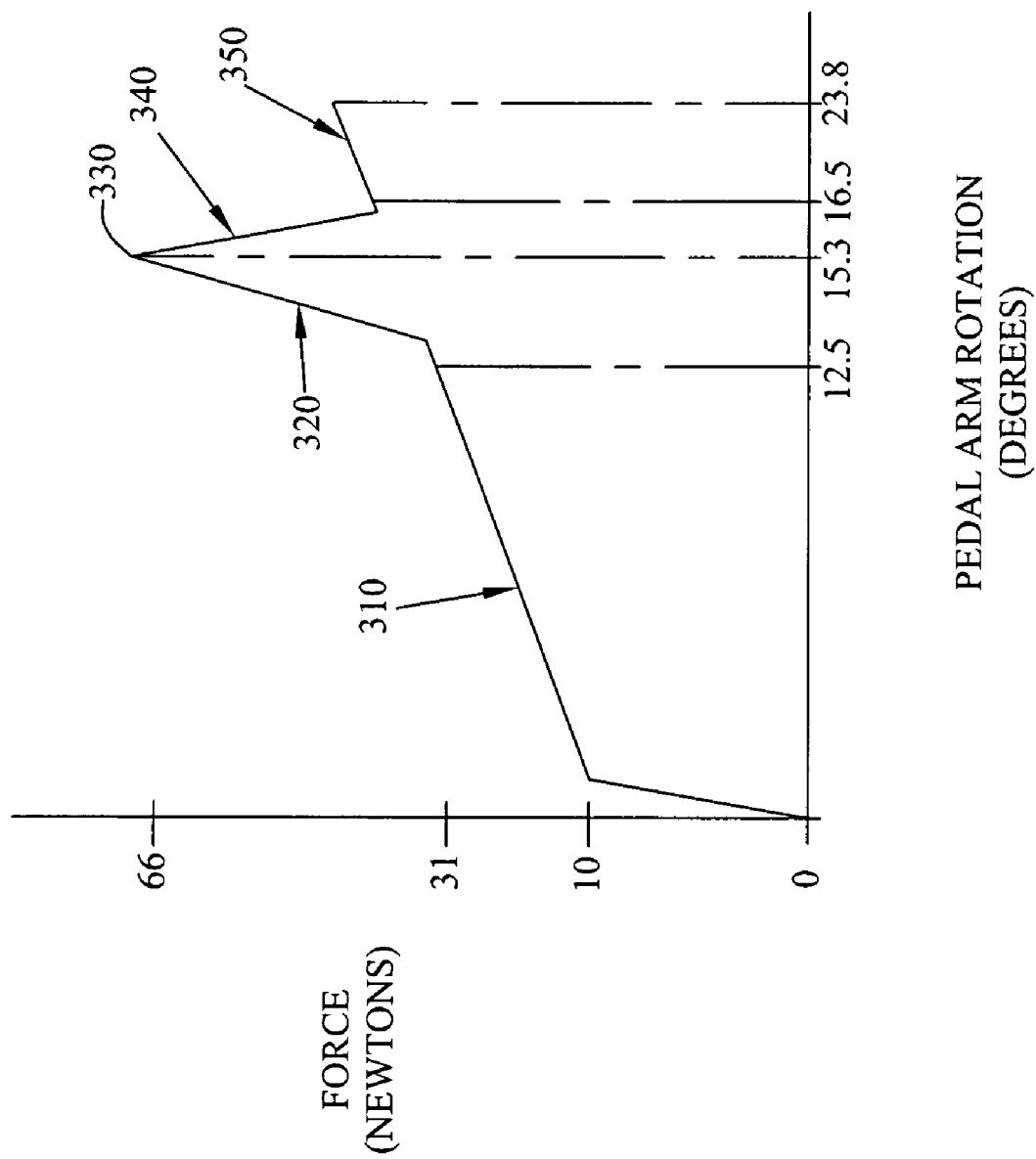
FIG. 7 is a graph of pedal arm rotation versus pedal arm force for the pedal assembly of FIG. 6.

A graph of force versus pedal arm rotation for pedal assembly 200 is shown in FIG. 7. With reference to FIGS. 6 and 7 when pedal arm 220 is initially rotated, the force increases generally linearly in region 310 from 10 newtons to 31 newtons, until approximately 12.5 degrees of pedal arm rotation. In region 310, another spring (not shown) in housing 210 is being compressed. At approximately 12.5 degrees of pedal arm rotation, piston 70 contacts boss 240. In region 320, between 12.5 degrees to 15.3 degrees of pedal arm rotation, the force increases generally linearly from 31 newtons to a peak at 66 newtons at point 330.

In region 320, the resistance of rods 90 and 92 (FIG. 3) sliding out of piston recesses 86 and 88 (FIG. 3) and the friction between piston sides 76, 78, 80, 82 and housing walls 40 (FIG. 3) is being overcome. After piston 70 (FIG. 3) has started moving into bore 38 (FIG. 3), the force decreases generally linearly in region 340. Region 340 occurs between 15.3 and 16.5 degrees of pedal arm rotation. As pedal arm 220 is further rotated in region 350, spring 94 is further compressed between 15.5 and 23.8 degrees of pedal arm rotation.

Numerous variations and modifications of the embodiment described above may be effected without departing from the spirit and scope of the novel features of the invention.

It is to be understood that no limitations with respect to the specific system or module illustrated herein are intended or should be inferred. It is, of course, intended to cover by the appended claims all such modifications as fall within the scope of the claims.

What is claimed is:

1. A vehicle pedal resistance mechanism adapted to generate a force sensed by a user as an increased resistance to depression of a vehicle pedal and comprising:
    a case including at least a first exterior side wall defining at least one slot and the case defining an interior bore;
    a piston mounted in the interior bore of the case and defining at least one recess and opposed ends, one of the opposed ends being disposed within the case and the other of the opposed ends extending from the case;
    a single spring located in the case between an interior wall of the case and the one of the opposed ends of the piston and biasing the piston outwardly from the case;
    at least one rod located in the case adjacent the at least one recess: and
    a retainer including at least a first arm extending along the at least first exterior side wall of the case and biasing the at least one rod in the direction of the at least one recess, the piston being movable from a first position in which the at least one rod is seated in the recess in the piston to a second position in which the at least one rod is seated outside the at least one recess and in the at least one slot defined in the at least first exterior side wall of the case.

2. A vehicle pedal resistance mechanism adapted to generate a force sensed by a user as an increased resistance to depression of a vehicle pedal and comprising:
    a case including at least a first exterior side wall and defining an interior bore;
    a piston mounted in the interior bore of the case and defining at least one recess and opposed ends, one of the opposed ends being disposed within the case and the other of the opposed ends extending from the case;
    a single spring located in the case between an interior wall of the case and the one of the opposed ends of the piston and biasing the piston outwardly from the case;
    at least one rod located in the case adjacent the at least one recess; and
    a retainer including at least a first arm extending along the at least first exterior side wall of the case and biasing the at least one rod in the direction of the at least one recess, the piston being movable from a first position in which the at least one rod is seated in the recess to a second position in which the at least one rod is seated outside the at least one recess, the case defining a peripheral exterior recess and the retainer is mounted in the peripheral exterior recess defined by the case.

3. The vehicle pedal resistance mechanism according to claim 2, wherein the retainer has the at least first arm and a second opposed arm and a central portion joining the at least first arm and the second arm.

4. The vehicle pedal resistance mechanism according to claim 3 wherein the at least one recess defined in the piston comprises a first recess and a second opposed recess and the at least one rod comprises first and second rods adapted to be seated in the first and second opposed recesses defined in the piston, the at least one first arm biasing the first rod in the first recess and the second arm biasing the second rod in the second recess.

5. A device for generating an opposing force on a pedal used in a vehicle and comprising:
    a housing defining a single interior bore and first and second slots;
    a piston located in the interior bore of the housing and defining opposed first and second ends and being at least partially disposed in the housing;
    first and second exterior recesses defined on opposite sides of the piston;
    a spring located in the housing between the first end of the piston and an interior wall of the housing for biasing the piston outwardly from the case;
    first and second rods disposed in the first and second recesses in a first position of the piston and disposed in the first and second slots in the housing in a second position of the piston; and
    a single retainer including a base and first and second opposed arms extending from the base and located on opposite sides of the piston, the first and second arms biasing the first and second rods respectively inwardly from the second position in the first and second slots in the housing to the first position in the first and second recesses of the piston.

6. A vehicle pedal resistance device adapted to generate a force adapted to be transmitted through the vehicle pedal to the foot of a vehicle operator and comprising:
    a case including at least first and second exterior sides and defining a interior bore and an exterior recess;
    a piston having a first end located in the first interior bore of the case and a second end extending from the case, the piston having opposed first and second exterior sides defining first and second recesses respectively;
    a spring located in the first interior bore of the case between the piston and an interior wall of the case for biasing the piston from the case;
    first and second elongated rods located in the first and second recesses respectively of the piston in a first position of the piston; and
    a generally U-shaped retainer mounted in the exterior recess defined in the case and including base and first and second arms located on the opposed first and second exterior sides of the case and biasing the first and second elongated rods respectively towards the piston, the first and second exterior sides of the case defining first and second slots respectively, the first and second arms of the retainer biasing the first and second elongated rods respectively from the first and second slots respectively into the first and second recesses respectively defined in the piston.

* * * * *